US009469535B2

(12) United States Patent
Biausque et al.

(10) Patent No.: US 9,469,535 B2
(45) **Date of Patent: *Oct. 18, 2016**

(54) METHODS TO SYNTHESIZE NIPT BIMETALLIC NANOPARTICLES BY A REVERSED-PHASE MICROEMULSION, DEPOSITION OF NIPT BIMETALLIC NANOPARTICLES ON A SUPPORT, AND APPLICATION OF THE SUPPORTED CATALYST FOR $CO_2$ REFORMING OF METHANE

(71) Applicant: King Abdullah University of Science and Technology, Thuwal (SA)

(72) Inventors: Gregory Biausque, Chester-le-Street (GB); Paco Laveille, Thuwal (SA); Dalaver H. Anjum, Thuwal (SA); Valerie Caps, Strasbourg (FR); Jean-Marie Basset, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/675,984

(22) Filed: Apr. 1, 2015

(65) Prior Publication Data

US 2015/0266732 A1 Sep. 24, 2015

Related U.S. Application Data

(62) Division of application No. 14/047,211, filed on Oct. 7, 2013, now Pat. No. 9,017,576.

(60) Provisional application No. 61/710,827, filed on Oct. 8, 2012.

(51) Int. Cl.
*C07C 1/02* (2006.01)
*B01J 23/00* (2006.01)
(Continued)

(52) U.S. Cl.
CPC .................. *C01B 3/40* (2013.01); *B01J 21/04* (2013.01); *B01J 23/892* (2013.01); *B01J 35/0006* (2013.01); *B01J 35/006* (2013.01); *B01J 35/0013* (2013.01); *B22F 9/24* (2013.01);
(Continued)

(58) Field of Classification Search
CPC .... B01J 21/2104; B01J 21/063; B01J 21/08; B01J 21/18; B01J 23/892; C01B 2203/1058; C01B 2203/107
USPC ........ 252/373; 502/259, 262, 326, 327, 332, 502/334, 335, 350, 355, 439
See application file for complete search history.

(56) References Cited

U.S. PATENT DOCUMENTS 8,058,204 B2 11/2011 Zhang et al.
8,404,613 B2 3/2013 Adzic et al.

(Continued)

*Primary Examiner* — Cam N. Nguyen
(74) *Attorney, Agent, or Firm* — Thomas | Horstemeyer, LLP

(57) ABSTRACT

Embodiments of the present disclosure provide for methods of using $Ni_xPt_y$ nanoparticles, and the like. In an embodiment, a method of $CO_2$ reforming of methane is provided using supported $Ni_xPt_y$ nanoparticle material, wherein the $Ni_xPt_y$ nanoparticles have an average size of about 1.5 to 3 nm, wherein x is about 0.85 to 0.95 and y is about 0.05 to 0.15.

8 Claims, 10 Drawing Sheets

0.95 nm 1.05 nm 1 nm 1.25 nm 1.3 nm 0.95 nm 1.15 nm 20 nm 10 nm

(51) Int. Cl.

| | |
|---|---|
| ***B01J 23/02*** | (2006.01) |
| ***B01J 23/08*** | (2006.01) |
| ***B01J 23/40*** | (2006.01) |
| ***B01J 23/42*** | (2006.01) |
| ***B01J 23/56*** | (2006.01) |
| ***B01J 21/00*** | (2006.01) |
| ***B01J 21/04*** | (2006.01) |
| ***C01B 3/40*** | (2006.01) |
| ***B01J 23/89*** | (2006.01) |
| ***C01B 3/26*** | (2006.01) |
| ***B22F 9/24*** | (2006.01) |
| ***C22C 19/03*** | (2006.01) |
| ***H01M 4/92*** | (2006.01) |
| ***C22C 19/05*** | (2006.01) |
| ***B01J 35/00*** | (2006.01) |
| *B22F 1/00* | (2006.01) |

(52) U.S. Cl.

CPC ................. *C01B3/26* (2013.01); *C22C 19/03* (2013.01); *C22C 19/058* (2013.01); *H01M 4/921* (2013.01); *B22F 1/0018* (2013.01); *B22F 2304/054* (2013.01); *C01B 2203/0238* (2013.01); *C01B 2203/107* (2013.01); *C01B 2203/1058* (2013.01); *C01B 2203/1082* (2013.01); *C01B 2203/1241* (2013.01); *Y02E 60/50* (2013.01)

(56) References Cited

U.S. PATENT DOCUMENTS

| | | | |
|---|---|---|---|
| 8,450,235 | B2 | 5/2013 | Suzuki et al. |
| 8,461,373 | B2 | 6/2013 | Suzuki et al. |
| 8,652,987 | B2 | 2/2014 | Sakamoto et al. |
| 8,741,801 | B2 | 6/2014 | Fang et al. |
| 8,895,206 | B2 | 11/2014 | Erlebacher et al. |
| 8,912,114 | B2 | 12/2014 | Mukerjee |
| 2005/0170222 | A1 | 8/2005 | Strasser et al. |
| 2006/0280997 | A1 | 12/2006 | Yoo et al. |
| 2008/0166623 | A1 | 7/2008 | Cendak et al. |
| 2011/0129743 | A1 | 6/2011 | Xu et al. |
| 2012/0129686 | A1 | 5/2012 | Querner et al. |
| 2012/0264598 | A1 | 10/2012 | Carpenter et al. |
| 2013/0334097 | A1 | 12/2013 | Patino et al. |

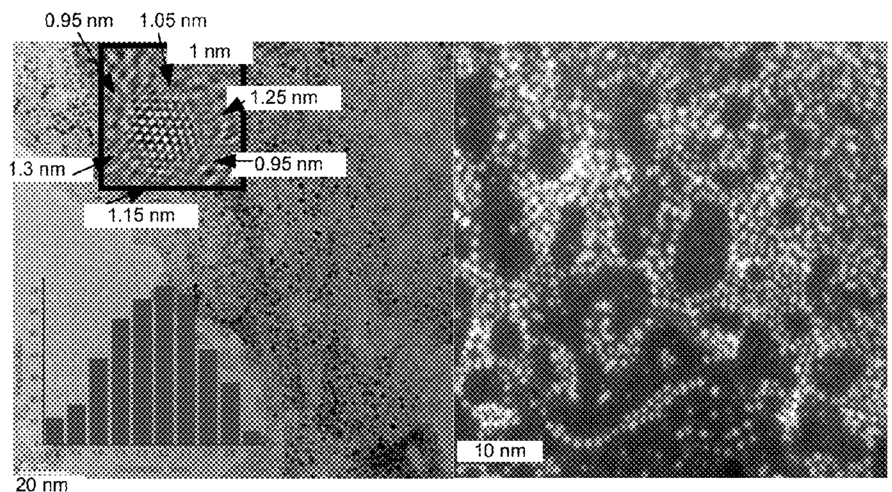
FIG. 1.1
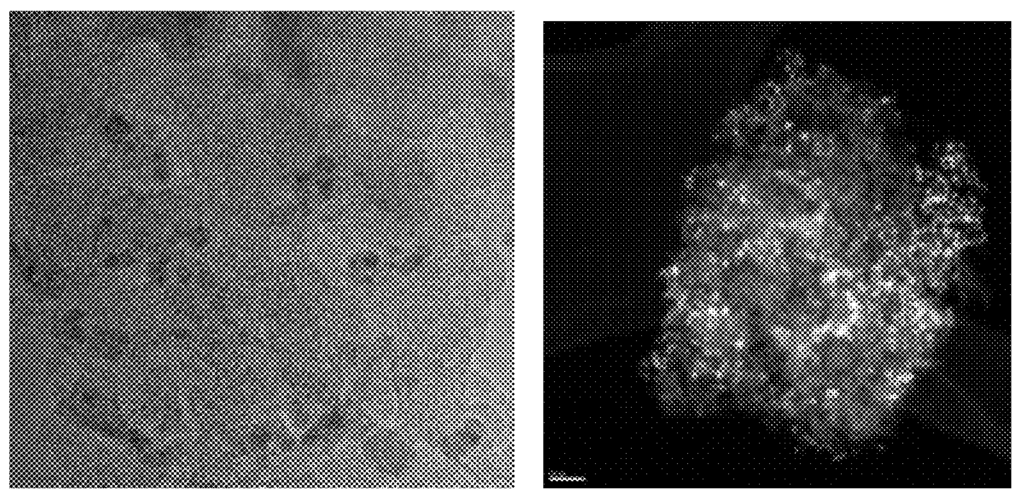
FIG. 1.2

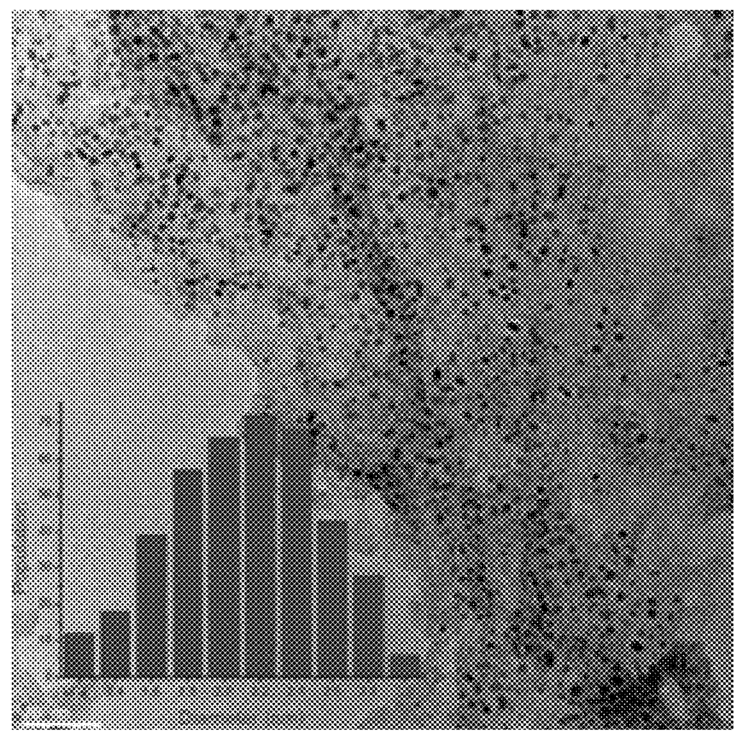
FIG. 2.1
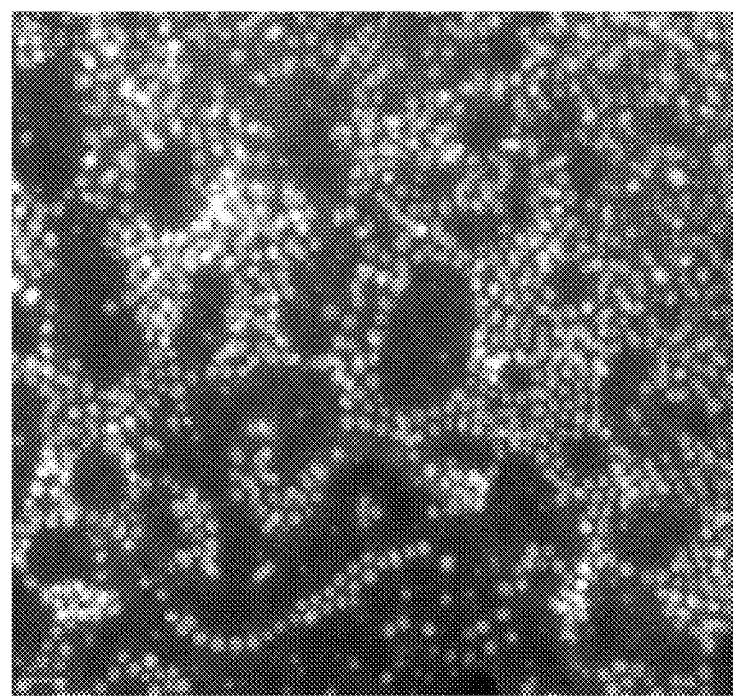
FIG. 2.2

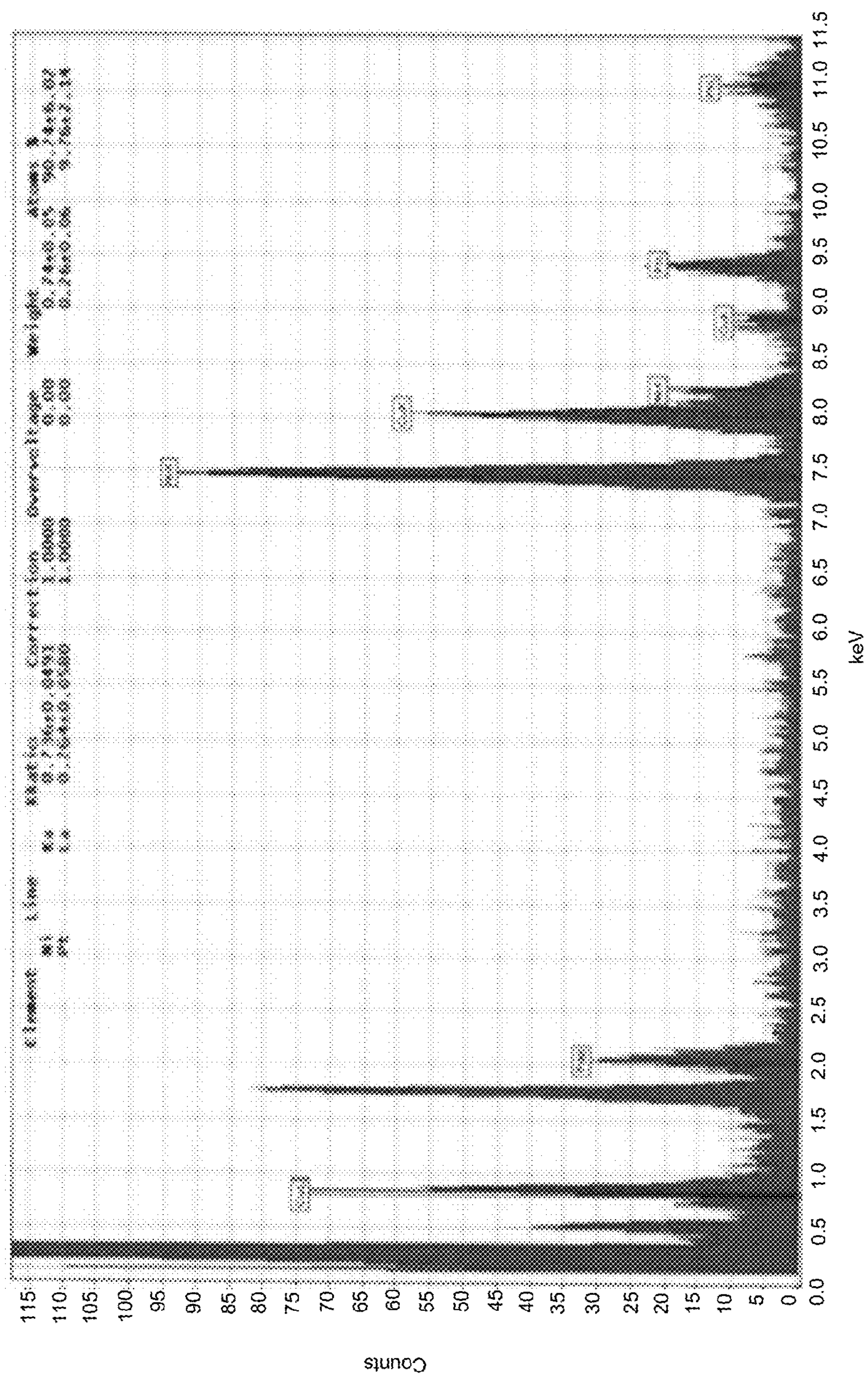
FIG. 2.3

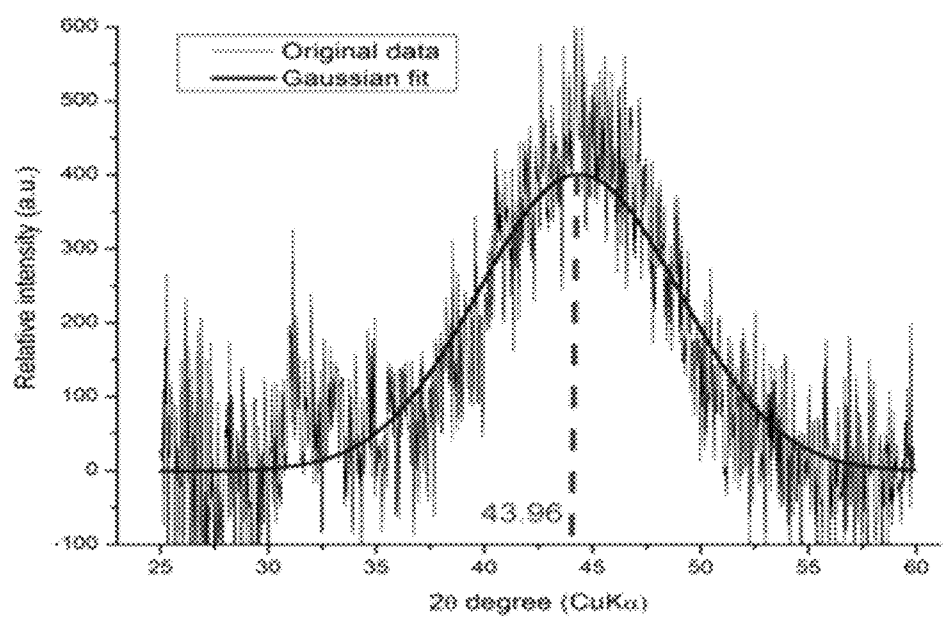
FIG. 2.4

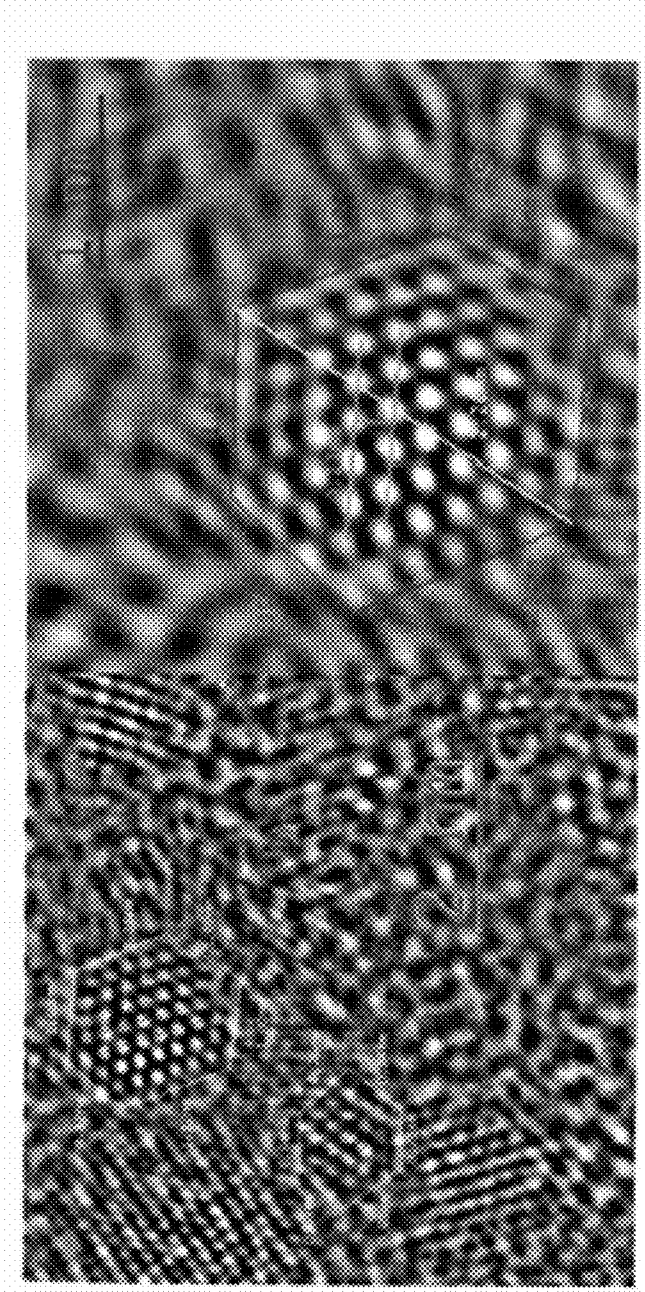
FIG. 2.5B
FIG. 2.5A

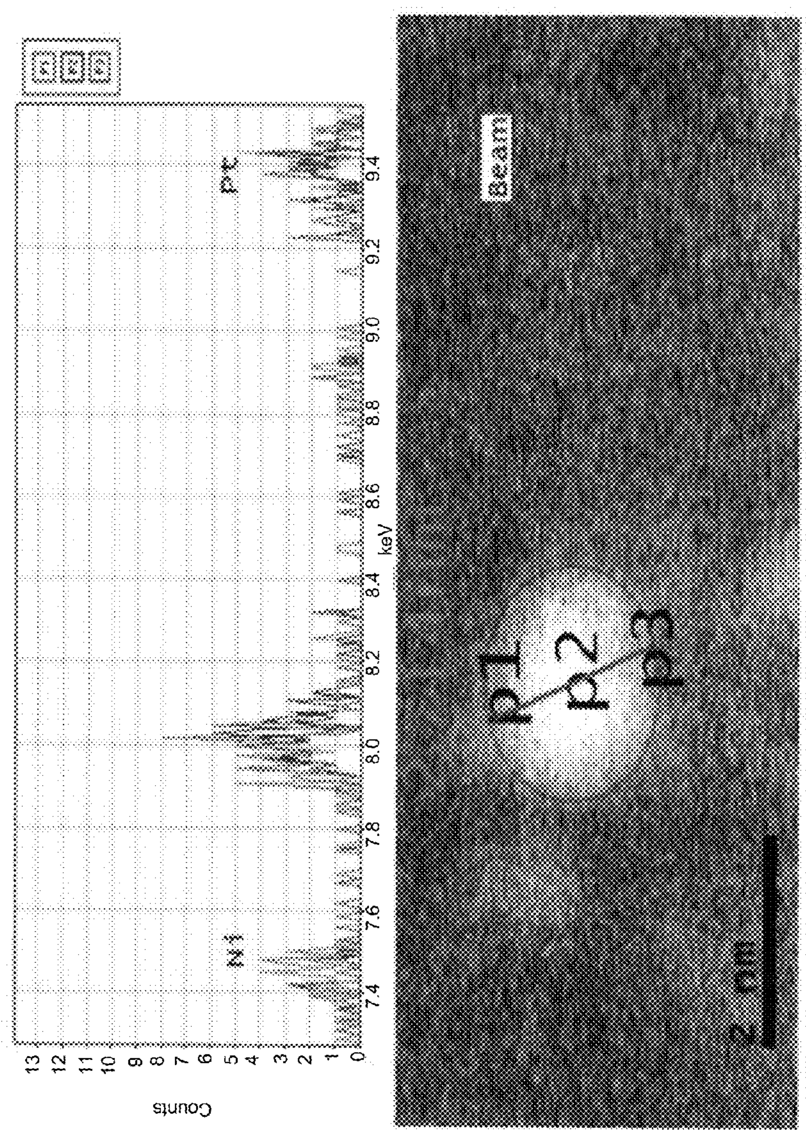
FIG. 2.6A

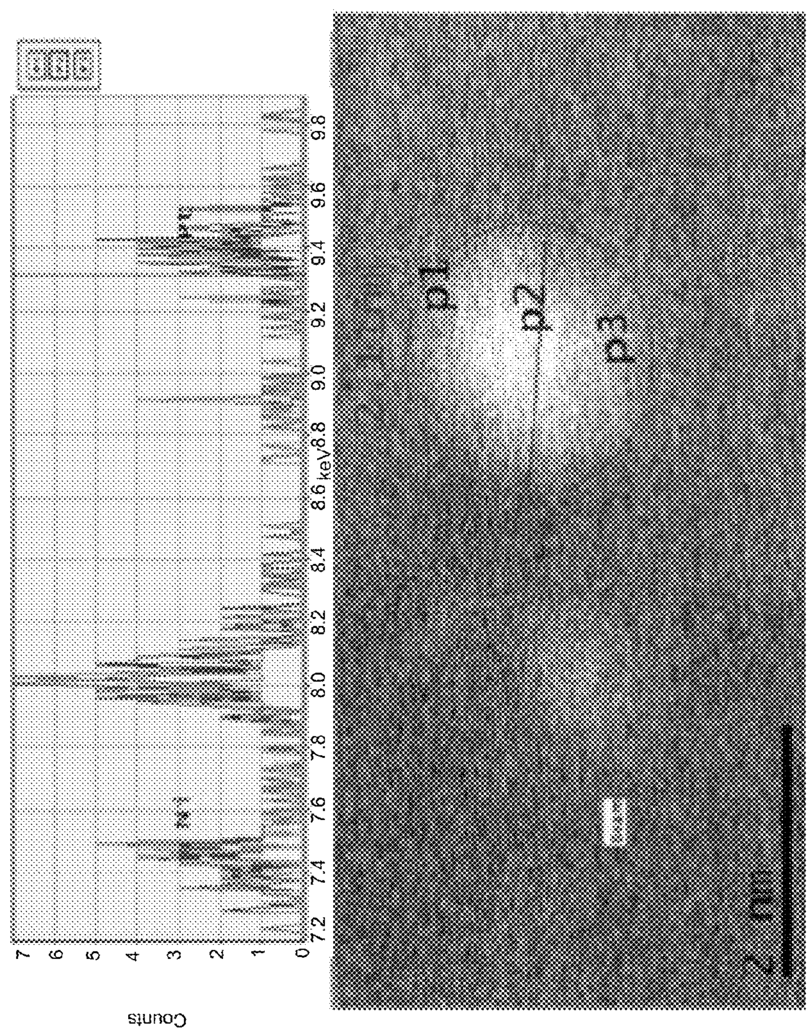
FIG. 2.6B

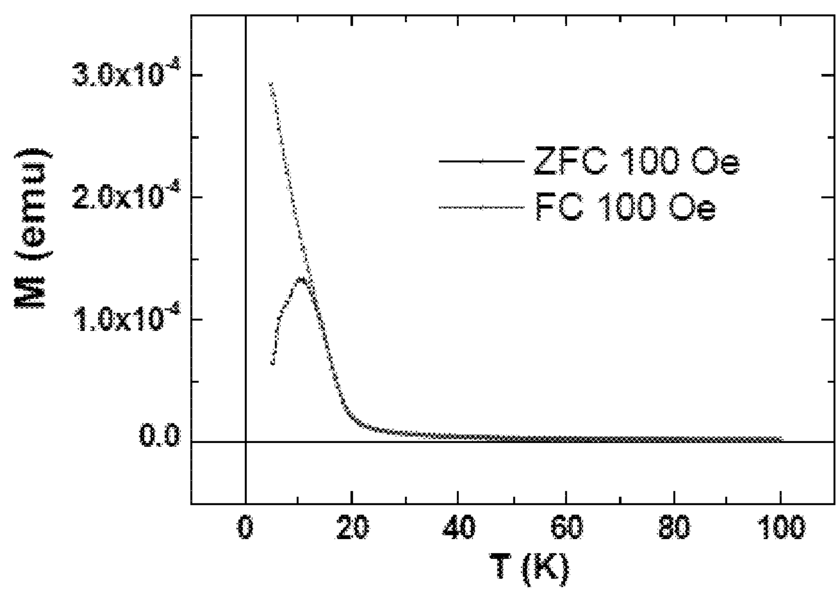
FIG. 2.7

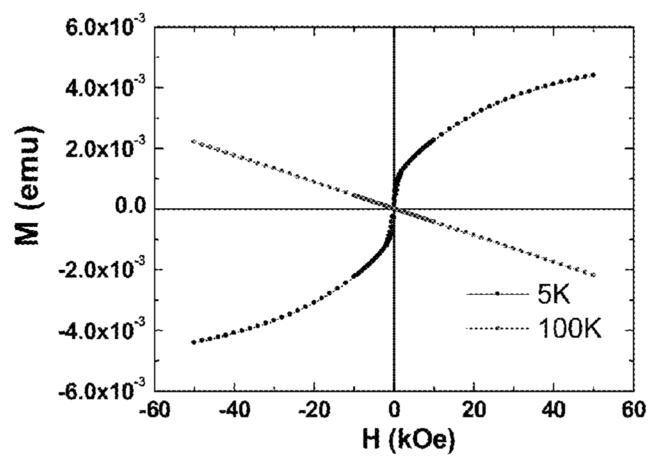
FIG. 2.8
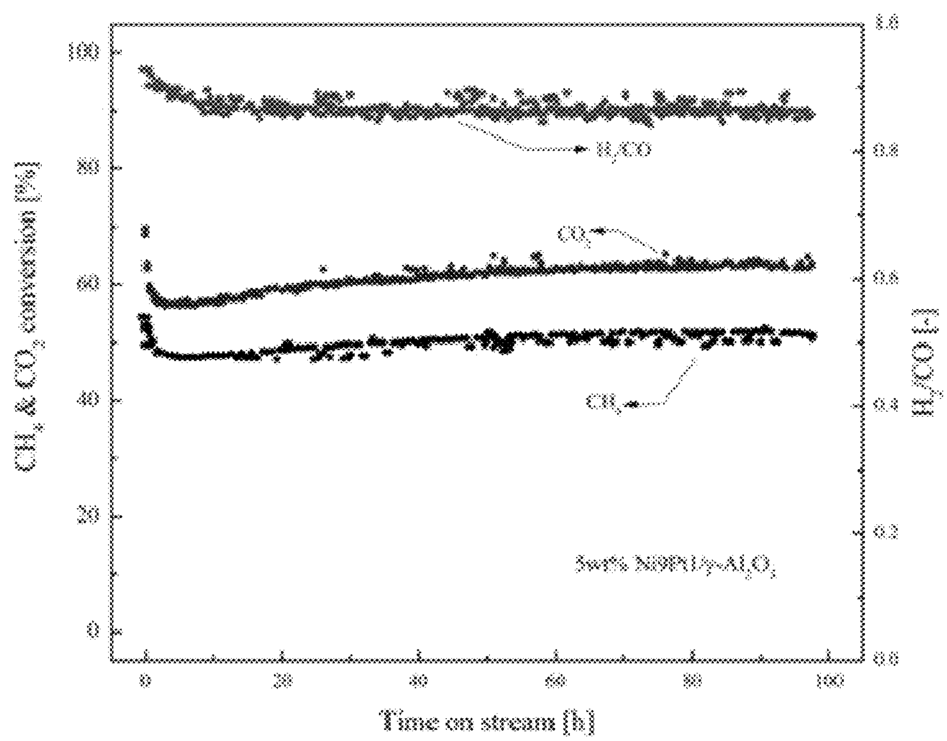
FIG. 3.1

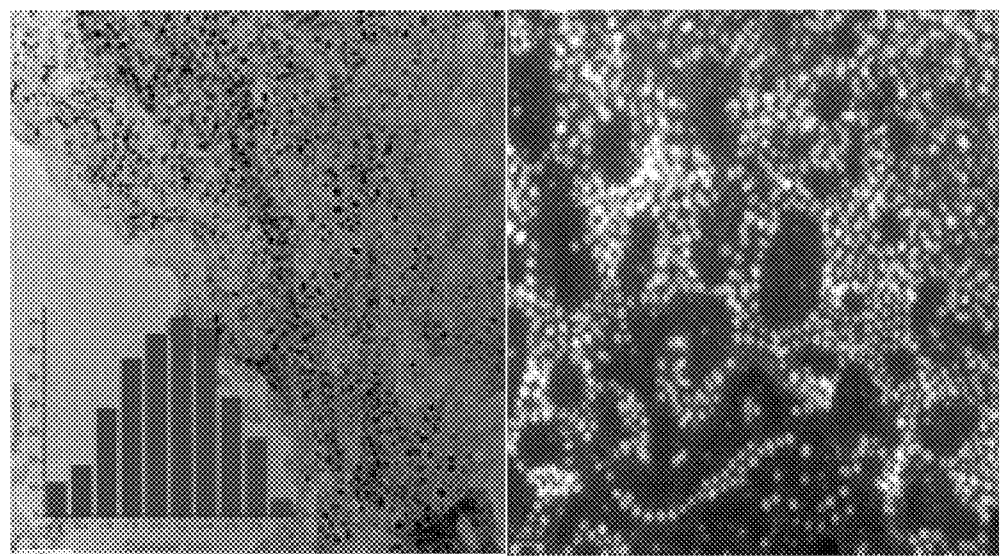
FIG. 3.2
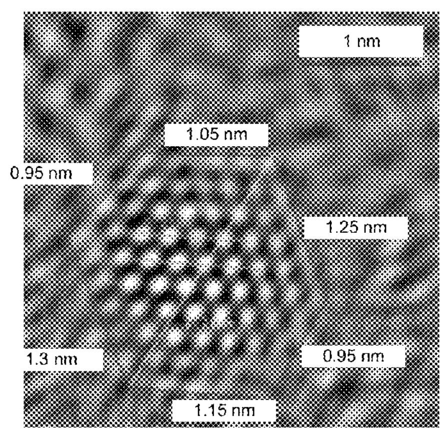
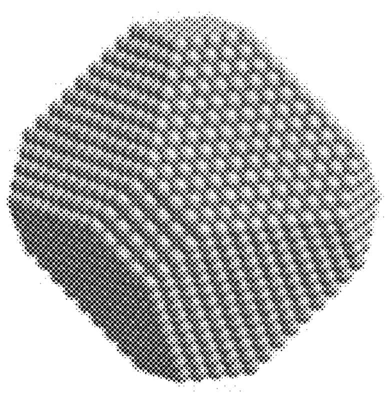
FIG. 3.3

METHODS TO SYNTHESIZE NIPT BIMETALLIC NANOPARTICLES BY A REVERSED-PHASE MICROEMULSION, DEPOSITION OF NIPT BIMETALLIC NANOPARTICLES ON A SUPPORT, AND APPLICATION OF THE SUPPORTED CATALYST FOR $CO_2$ REFORMING OF METHANE

CROSS REFERENCE TO RELATED APPLICATIONS

This application is a divisional application of U.S. patent application entitled "METHODS TO SYNTHESIZE NiPt BIMETALLIC NANOPARTICLES BY A REVERSED-PHASE MICROEMULSION, DEPOSITION OF NiPt BIMETALLIC NANOPARTICLES ON A SUPPORT, AND APPLICATION OF THE SUPPORTED CATALYST FOR $CO_2$ REFORMING OF METHANE," having Ser. No. 14/047,211 filed on Oct. 7, 2013, which claims priority to U.S. Provisional application entitled "NiPt nanoparticles, compositions and substrates including NiPt nanoparticles, methods of making NiPt nanoparticles, methods of using NiPt nanoparticles," having Ser. No. 61/710,827, filed on Oct. 8, 2012, which are incorporated herein by reference in their entirety.

BACKGROUND

The upgrading of natural gas, which is mainly composed of methane, to easily transportable valuable products (such as hydrocarbons, gasoline, methanol and dimethyl ether) is a predominant field of research for the XXI century. Indeed, oil resources cannot meet the exponentially increasing energetic requirements of the world. Moreover, this fossil energy leads to global warning due to $CO_2$ generation during the chemical transformation. Many efforts are done in order to reduce $CO_2$ formation but also to use it into chemical process ($CO_2$-rich gas syntheses Today, most of the carbonaceous gas-to-liquid (GTL) reactions are using syngas ($H_2$/CO mixture) as reagent. This mixture is synthesized by the steam reforming of methane. However, the 3:1 $H_2$/CO ratio obtained by this process is not well adapted to GTL technologies. One alternative process is the dry reforming of methane (DRM), which is both an industrial and academic challenge. It produces in a $CO_2$-rich gas synthesis the "ideal" 1:1 CO/$H_2$ for the gas-to-liquid technology. This unique process can indeed be potentially used in the Fischer-Tropsch process for long chain hydrocarbons and dimethyl ether syntheses.

However, this reaction is not easy to scale-up due to its high endothermicity requiring high temperature. It leads to the main limitation, which is the stability of the catalyst. The two main causes for deactivation are sintering (growth) of metallic nanoparticles and formation of carbonaceous deposits (coking), which both result in a loss of active sites. Amongst the $d^6$, $d^7$ and $d^8$ transition metals that can efficiently catalyze DRM, nickel is considered the best candidate for industrial application, combining high activity and low cost. However, it is more sensitive to coking and sintering than noble metals. Thus, there is a need to address these and other needs.

SUMMARY

Embodiments of the present disclosure provide for NiPt nanoparticles, compositions and supports including NiPt nanoparticles, methods of making NiPt nanoparticles, methods of supporting NiPt nanoparticles, methods of using NiPt nanoparticles, and the like.

In an embodiment, a particle, among others, can include: $Ni_xPt_y$ nanoparticles having an average size of about 1.5 to 3 nm, wherein x is about 0.85 to 0.95 and y is about 0.05 to 0.15.

In an embodiment, a composition, among others, can include: a plurality of $Ni_xPt_y$ nanoparticles having an average size of about 1.5 to 3 nm, wherein x is about 0.85 to 0.95 and y is about 0.05 to 0.15.

In an embodiment, a functional nanomaterial, among others, can include: a plurality of $Ni_xPt_y$ nanoparticles having an average size of about 1.5 to 3 nm, wherein x is about 0.85 to 0.95 and y is about 0.05 to 0.15.

In an embodiment, a method of making a nanoparticle, among others, can include: mixing a first microemulsion solution with a second microemulsion solution, wherein the first microemulsion solution includes a nickel precursor, a platinum precursor, and water, wherein the second microemulsion solution includes a reducing agent, a precipitating agent, and water; cooling the mixture while mixing; and forming $Ni_xPt_y$ nanoparticles having an average size of about 1.5 to 3 nm, wherein x is about 0.85 to 0.95 and y is about 0.05 to 0.15. In an embodiment, the method can further include: mixing a support in a deposition solvent to form a second mixture; disposing the mixture in the second mixture to form a third; heating the third mixture at 80° C. under reflux; recovering a solid from the third mixture; and calcining the solid. In addition, an embodiment can include a solid obtained from the foregoing method.

In an embodiment, a composition, among others, can include: $Ni_xPt_y$ nanoparticle disposed on a support, wherein the $Ni_xPt_y$ nanoparticles have an average size of about 1.5 to 3 nm, wherein x is about 0.85 to 0.95 and y is about 0.05 to 0.15. In an embodiment, the support can include: alumina, silica, titania, or activated carbon.

In an embodiment, a method, among others, can include: $CO_2$ reforming of methane using supported $Ni_xPt_y$ nanoparticle material, wherein the $Ni_xPt_y$ nanoparticles have an average size of about 1.5 to 3 nm, wherein x is about 0.85 to 0.95 and y is about 0.05 to 0.15.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1.1 illustrates a TEM picture (left) and STEM picture (right) of $Ni_{0.9}Pt_{0.1}$ nanoparticles.

FIG. 1.2 illustrates a TEM (left) and STEM (right) characterization of supported NiPt nanoparticles synthesize from the microemulsion.

FIG. 2.1 illustrates a TEM picture of the $Ni_{0.9}Pt_{0.1}$ and size distribution diagram.

FIG. 2.2 illustrates a STEM picture of the nanoparticles.

FIG. 2.3 illustrates a EDS spectrum of $Ni_{0.9}Pt_{0.1}$ nanoparticles.

FIG. 2.4 illustrates a XRD pattern of the evaporated micro-emulsion system in the 2θ range of 25 to 60°.

FIGS. 2.5A and 2.5B illustrate CS-HRTEM of the nanoparticles of the present disclosure.

FIGS. 2.6A and 2.6B illustrate elemental mapping pictures on two different particles obtained by STEM-EDS FIG. 2.7 illustrate the properties of $Ni_{0.9}$ $Pt_{0.1}$ nanoparticles of 2.1 nm in diameter.

FIG. 2.8 illustrates hysteresis loops measured at 5 K and 100 K.

FIG. 3.1 illustrates conversion of $CH_4$ and $CO_2$ at 700 C over $Al_2O_3$ supported NiPt catalyst prepared by microemulsion.

FIG. 3.2 illustrates a TEM picture (left) and a STEM picture (right) of $Ni_{0.9}Pt_{0.1}$ nanoparticles.

FIG. 3.3 illustrates a CS-HRTEM of $Ni_{0.9}Pt_{0.1}$ nanoparticles (left), and a truncated octahedron (right).

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of material science, chemistry, physics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Each of the applications and patents cited in this text, as well as each document or reference cited in each of the applications and patents (including during the prosecution of each issued patent; "application cited documents"), and each of the PCT and foreign applications or patents corresponding to and/or claiming priority from any of these applications and patents, and each of the documents cited or referenced in each of the application cited documents, are hereby expressly incorporated herein by reference. Further, documents or references cited in this text, in a Reference List before the claims, or in the text itself; and each of these documents or references ("herein cited references"), as well as each document or reference cited in each of the herein-cited references (including any manufacturer's specifications, instructions, etc.) are hereby expressly incorporated herein by reference.

Discussion

Embodiments of the present disclosure provide for NiPt nanoparticles, compositions and supports including NiPt nanoparticles, methods of making NiPt nanoparticles, methods of supporting NiPt nanoparticles, methods of using NiPt nanoparticles, and the like.

An advantage of the an embodiment of the present disclosure is that $Ni_xPt_y$ nanoparticles can be formed using a "one-pot" bottom-up method that avoids some of the harsh conditions used by other techniques. In general, the synthesis of metallic Ni nanoparticles is difficult because 1) of the reactivity of Ni and Ni precursors towards $NaBH_4$, leading to Ni borides, 2) of the poor reducibility of nickel cations (standard reduction potential of $Ni^{2+}+2\ e^- \rightarrow Ni$ ($E^0=-0.26$ eV)) regarding reducing amine agent, and 3) of their magnetic properties which lead to a very fast aggregation. Hence the synthesis of metallic Ni nanoparticles often requires harsh treatment that favors growth of the particles. Particles typically of 10 nm can be produced but to go down in size, the particles need to be protected during the reduction in such a way, that reduction can be completed without significant growing of the particle. However, these techniques are limited on the how small the nanoparticles can be produced. Embodiments of the present disclosure can produce $Ni_xPt_y$ nanoparticles having an average size of about 3 nm or less.

It should also be noted that many functional properties of materials depend on the size of the primary unit. For Ni particles, both its magnetic and catalytic properties tend to vary with the size of the crystallite. Thus, embodiments of the present disclosure provide for $Ni_xPt_y$ nanoparticles that are thermally stable relative other particles and could also be considered as alternatives to the typical Ni-based reforming catalysts.

In an embodiment, the $Ni_xPt_y$ nanoparticles can have an average diameter of about 1.5 to 3 nm or about 1.9 to 2.5 nm or has a diameter of about 1.5 to 3 nm or about 1.9 to 2.5 nm. In an embodiment, x is about 0.5 to 0.95, or about 0.9, and y is about 0.05 to 0.5 or about 0.1.

In an embodiment, a plurality of $Ni_xPt_y$ nanoparticles can be included in a composition or disposed on a support (e.g., $\gamma$-$Al_2O_3$, alumina, silica, titania, or activated carbons) to form a supported nanoparticle material.

In an embodiment, the $Ni_xPt_y$ nanoparticles can be made by mixing a first microemulsion solution with a second microemulsion solution. In an embodiment, the first microemulsion solution and the second microemulsion solution are optically transparent. In an embodiment, the mixture of the first and second microemulsions are mixed and cooled for a time frame of about 2 to 4 hours to about 2 to 4 weeks until the solid forms that include the $Ni_xPt_y$ nanoparticles. In an embodiment, the molar ratio of metals/reducing agent/precipitating agent is about 1:12:5 to 1:6:1 or about 1:9:2.5. As noted above, a diameter of $Ni_xPt_y$ nanoparticles is about 1.5 to 3 nm.

In an embodiment, the first microemulsion solution includes a nickel precursor, a platinum precursor, and water. In an embodiment, the platinum precursor and the nickel precursor have a molar ratio of about 2:98 to 50:50, about 1:9, about 20:80, or about 50:50. In an embodiment, the platinum precursor can be selected from: platinum (IV) chloride, ammonium hexachloroplatinate (IV), sodium hexachloroplatinate (IV) hexahydrate, potassium hexachloroplatinate (IV), or a combination thereof. In an embodiment, the nickel precursor can be selected from: nickel nitrate hexahydrate, nickel chloride, or a combination thereof.

In an embodiment, the second microemulsion solution includes a reducing agent, precipitating agent, and water. In an embodiment, the reducing agent and the precipitating agent have a molar ratio of about 12:5 to 6:1. In an embodiment, the reducing agent can be selected from: hydrazine, sodium borohydride, or a combination thereof. In an embodiment, the precipitating agent can be selected from: ammonium hydroxide, sodium hydroxide, calcium carbonate, or a combination thereof.

In a particular embodiment, a reverse microemulsion system has been prepared by mixing water (MilliQ), cyclohexane (anhydrous, 99.9 Sigma Aldrich) and polyoxyethylene (5) nonylphenylether (a nonionic surfactant, Igepal®CO520 also denoted NP5). Nickel nitrate hexahydrate (99.999%-Sigma-Aldrich), platinum (IV) chloride (>99.99%, Sigma-Aldrich) were used as metallic precursors, hydrazine monohydrate ($N_2H_4$ 64-65%, reagent grade 98% Sigma-Aldrich) as the reducing agent, and ammonium hydroxide solution (28% $NH_3$ in $H_2O$) as the precipitating agent.

In an embodiment, two identical batches containing the same amount of cyclohexane (54 mL, continuous phase), 17.5 g of NP5 (nonionic surfactant) were loaded in a flask and stirred (600 rpm) at room temperature under air. In one of the batches, 838 μmol of nickel precursor (244 mg) and 93 μmol of platinum (IV) chloride (31 mg) previously dissolved in 3.6 mL of water (molar ratio 1/5/125 for NP5/water/cyclohexane) is added under high stirring (900 rpm) until optical transparence evidencing stability of the microemulsion.

In the second batch, an aqueous solution containing 480 μL of hydrazine, 2.1 mL of ammonium hydroxide solution [2 M] and 1 mL of water is added under vigorous stirring until optical transparence too (30 min) (molar ratio 1/5/125 for NP5/water/cyclohexane).

Finally the two stable microemulsions (total volume 150 mL) were combined under vigorous stirring (900 rpm) at room temperature under air. A condenser connected to a chiller (15° C.) is added on the flask to avoid any evaporation of cyclohexane. The molar ratio between metals/hydrazine/ammonia is fixed to 1/12/5. The transparent greenish micro-emulsion quickly turned pink in color. It is let under stirring (450 rpm) at room temperature until it turns black, indicating formation of solid particles (1 week).

In an embodiment, deposition of the NiPt nanoparticles contained in the microemulsion on $\gamma$-$Al_2O_3$ can be performed by mixing 475 mg of boehmite in 225 ml ethanol under vigorous stirring. Then 75 ml of the nanoparticles containing the microemulsion can be added drop-wise to the ethanol/boehmite mixture over a 30 minute period. The mixture can then heated at 80° C. under vigorous stirring, reflux, and an inert atmosphere for 12 h. The solid is then recovered by centrifugation, washed 3 times with ethanol and dried in an oven at 80° C. The dried material is then calcined under a dynamic flow of $H_2$/NO/Ar (5/5/90, 100 ml/min) at 700° C. for 3 h to get the gamma phase of $Al_2O_3$ supporting the NiPt nanoparticles (supported nanoparticle material). Additional details are provided in the Examples.

EXAMPLE

Example 1

Brief Introduction

Nickel is a promising metal for reforming reactions. However, for dry reforming of methane (DRM), the stability of the catalyst is compromised by a combination of sintering and coke formation due to the high temperature used. Recently, a new catalyst with improved stability has reached the market; it includes bimetallic particles supported on a mixed oxide. This example provides results of a study, that aims at identifying and understanding the key parameters involved in DRM and ultimately lay the basis for the rational design of a DRM catalyst with optimized stability.

Introduction

The upgrading of natural gas, which is mainly composed of methane, to easily transportable valuable products (such as hydrocarbons, gasoline, methanol, and dimethyl ether) is a predominant field of research for the XXI century. Indeed, oil resources cannot meet the exponentially increasing energetic requirements of the world. Moreover, this fossil energy leads to global warning due to $CO_2$ generation during the chemical transformation. Many efforts are done in order to reduce $CO_2$ formation but also to use it into chemical process ($CO_2$-rich gas syntheses).

Today, most of the carbonaceous gas-to-liquid (GTL) reactions are using syngas ($H_2$/CO mixture) as reagent. This mixture is synthesized by the steam reforming of methane (Equation 1). However, the 3:1 $H_2$/CO ratio obtained by this process is not well adapted to GTL technologies.

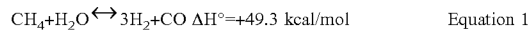

$$CH_4+H_2O \leftrightarrow 3H_2+CO \quad \Delta H°=+49.3 \text{ kcal/mol} \qquad \text{Equation 1}$$

One alternative process is the dry reforming of methane (DRM) (Equation 2), which is both an industrial and academic challenge.

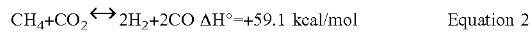

$$CH_4+CO_2 \leftrightarrow 2H_2+2CO \quad \Delta H°=+59.1 \text{ kcal/mol} \qquad \text{Equation 2}$$

It produces in a $CO_2$-rich gas synthesis the "ideal" 1:1 $CO/H_2$ for the gas-to-liquid technology. This unique process can indeed be potentially used in the Fischer-Tropsch process for long chain hydrocarbons (Equation 3) and dimethyl ether (Equation 4) syntheses.

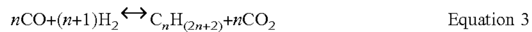

$$nCO+(n+1)H_2 \leftrightarrow C_nH_{(2n+2)}+nCO_2 \qquad \text{Equation 3}$$

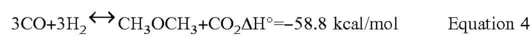

$$3CO+3H_2 \leftrightarrow CH_3OCH_3+CO_2 \Delta H°=-58.8 \text{ kcal/mol} \qquad \text{Equation 4}$$

However, this reaction is not easy to scale-up due to its high endothermicity requiring high temperature. It leads to the main limitation, which is the stability of the catalyst. The two main causes for deactivation are sintering (growth) of metallic nanoparticles and formation of carbonaceous deposits (coking), which both result in a loss of active sites.

Amongst the $d^6$, $d^7$ and $d^8$ transition metals that can efficiently catalyze DRM, nickel is considered the best candidate for industrial application, combining high activity and low cost [1]. However, it is more sensitive to coking and sintering than noble metals.

Recently, it has been claimed that the Carbon Sciences® catalyst based on bi-metallic particles (Co—Ni) supported on MgO—$Al_2O_3$ exhibited extended durability in DRM. It combines modification of both the nickel particle and the alumina support (by alloying and by addition of basic functions, respectively) which are both known to increase coke resistance and lifetime of the catalyst [2, 3]. However, since coking is reported to mainly occur on metal particles typically larger than 10 nm [4, 5], synthesizing smaller nickel particles (<5 nm) and focusing on stabilizing their size throughout the DRM reaction should prove useful in further enhancing the durability of the DRM catalyst. One way to achieve that is to elaborate a bi-metallic system in which the second metal has a higher melting point than nickel [6], e.g., a noble metal [7].

Experimental

The synthesis of $Ni_{0.9}Pt_{0.1}$ nanoparticles is carried out in a reverse microemulsion "water in oil" system using cyclohexane as continuous phase, water as discontinuous media and polyoxyethylene (5) nonylphenylether (as nonionic surfactant, Igepal®CO520 also denoted NP5). Co-reduction of the metal nitrates is achieved by a mixture of hydrazine and ammonia in excess.

In an embodiment, the NiPt nanoparticles synthesized from microemulsion are stabilized in water micelles surrounded by surfactant molecules. This strong stabilization of the NiPt nanoparticles reduces the possible interaction between the metal part and the support, making the deposition process difficult to achieve. However a suitable deposition method for these nanoparticles prepared by microemulsion can be optimized. The deposition method described below can be optimized for a boehmite support and can be extended to other crystalline phases of $Al_2O_3$, $Ce_2O_3$, $ZrO_2$, $SiO_2$, mixed-oxides composed from 2 or more of these oxides materials, $Ni/Al_2O_3$ spinel structure, and activated carbon.

In general, to achieve a proper deposition of the NiPt nanoparticles contained in the microemulsion, the oxide support is mixed, under vigorous stirring, to a large volume of solvent that has the property to destabilize the microemulsion. The selected solvent must be soluble in both the water (contained in the micelles droplets) and the organic phase of the microemulsion. The deposition protocol is described for ethanol but other deposition solvents with similar solubility properties can be used including: acetone, methanol and isopropanol. In an embodiment, the volume of solvent used is based on the volume of microemulsion to treat and can be about 1 to 10 times or about 3 times the microemulsion volume. In an embodiment, the mass of inorganic support, mixed to the deposition solvent, can be calculated according the final desired metal mass loading on the support. In an embodiment, the metal loading can vary from 0.5% to 20% and about 5% (w/w). Therefore, for 75 ml of microemulsion, containing 50 mg of NiPt nanoparticles, 475 mg of boehmite are mixed with 225 ml of ethanol.

To this mixture, the microemulsion containing the metal nanoparticles can be added drop-wise. In an embodiment, the dropping rate can be about 1 ml/min to 10 ml/min or about 2 ml/min. Vigorous stirring is kept during the whole process of deposition. After addition of the microemulsion, the mixture can be heated at about 80° C. under reflux and inert atmosphere for 2 to 24 h or about 12 h.

The supported catalyst can then recovered by centrifugation, washed 3 times with ethanol, dried at 80° C. in an oven and calcined under a mixture of $NO/H_2/N_2$ (5/5/90, 100 ml/min total flow) at 700° C.

Catalytic tests are carried out in a fixed bed reactor (o.d. 6 mm, i.d. 4 mm quartz reactor) fitted with online μ-GC analysis, using a 10 vol. % $CH_4$/10 vol. % $CO_2$ in Ar gas mixture (60 sccm).

Results

In this microemulsion, $Ni_{0.9}$ $Pt_{0.1}$ particles are uniform in size. Statistical analysis of their size (TEM) gives a narrow distribution with an average diameter of 2.2±0.3 nm (FIG. 1.1), which is consistent with the mean size determined by SQUID.

The composition of each bimetallic particle, as determined by EDS-STEM, matches the 90/10 nominal composition. Statistical d-spacing measurements by Fast-Fourrier Transform in HRTEM and XRD analysis both show that the nanoparticles consist in a solid solution of Ni and Pt atoms. The facets exposed (CS-HRTEM) are consistent with a truncated octahedral shape (cubo-octahedron) of the 2 nm alloy particle.

TEM and STEM characterization after thermal treatment shows no aggregation of the supported bimetallic nanoparticles. Only a slight sintering is observed. The nanoparticle size grows from about 2.2 nm to about 4 nm (FIG. 1.2).

Conclusions

We have developed a method for the synthesis of Ni-rich nickel-platinum particles with controlled size (2 nm) and composition (solid solution). After deposition on selected supports, and in particular boehmite, $TiO_2$, $ZiO_2$, $Ce_2O_3$ earth-alkali alumina spinels, and activated carbon, it is expected that they will exhibit enhanced activity and high stability in the dry reforming of methane. Besides, this generic method can be applied to the synthesis of other bimetallic nanoparticles and can lead to the design of an optimized DRM catalyst.

REFERENCES FOR EXAMPLE 1, EACH OF WHICH IS INCORPORATED HEREIN BY REFERENCE

[1] M. C. J. Bradford, M. A. Vannice, Catalysis Reviews 41 (1999) 1-42; V. Havran, M. P. Dudukovi, C. S. Lo, Indus. Eng. Chem. Res. 50 (2011) 7089.

[2] T. Horiuchi, K. Sakuma, T. Fukui, Y. Kubo, T. Osaki, T. Mori, Appl. Catal. A 144 (1996) 111.

[3] K. Nagaoka, K. Takanabe, K.-i. Aika, Appl. Catal. A 268 (2004) 151.

[4] J.-H. Kim, D. J. Suh, T.-J. Park, K.-L. Kim, Appl. Catal. A 197 (2000) 191.

[5] J. Guo, H. Lou, X. Zheng, Carbon 45 (2007) 1314.

[6] A. Cao, G. Veser, Nature Materials 9 (2010) 75.

[7] D. Li, Y. Nakagawa, K. Tomishige, Appl. Catal. A 408 (2011) 1

Example 2

Brief Introduction

Metal alloy nanoparticles (NPs) have been the subject of large research for several catalytic applications. Control of the size, shape and composition is became a key parameters due to their relationship with activity and selectivity in catalysis. A one-pot synthesis route of 2 nm $Ni_{0.9}Pt_{0.1}$ nanoparticles with a narrow size distribution (15%) in reverse micro-emulsion by the simultaneous reduction of nickel and platinum precursor by hydrazine is presented in this Example. Thus, control of the size and composition of NiPt NPs can be reached by this method in an unusual aqueous media.

Introduction

The interest of small nanoparticles (NPs) arise, first, from they constitute a new type of materials presenting properties totally different compare to atoms and bulk materials and then from their size-dependent evolution[1, 2]. Especially, metal particles below about 2 nm show typical quantum size behavior, owing to the existence of discrete electronic energy levels and the loss of overlapping electronic bands, the characteristic of a bulk metal. They are to be considered as links between bulk metals and small molecular clusters. Thus many applications can be done with these unique materials such as electronics[3, 4], magnetic, optic[5], biology[6] and catalysis[7] fields.

In the field of the catalysis, metallic nanoparticles are very interesting due the high surface area to volume ratio where quantum effects predominate is entered. On the another hand, transition and noble metal or metal oxide nanoparticles presents polyhedra shape and uncommon exposed facet because they tried to decrease as much as possible their surface energy to volume ratio during their growth. It results generally to materials presenting better activity or selectivity[8, 9]. For example, tetrahedral platinum nanoparticles are composed of (111) facets and have sharp corners and edges. Cubic platinum nanoparticles are composed of (100) facets and have corners and edges that are not as sharp as the tetrahedral ones. The spherical platinum nanoparticles are really "near spherical" in shape and are composed of numerous (111) and (100) facets with corners and edges located at the interfaces of these facets[10]. Another interesting and high topic field is to prepare multimetallic nanoparticles due to the ability to tune the properties of them just by changing the composition. It is relatively admitted that combining two metals lead to combine also the properties of each taken independently[11, 12]. Thus it has been possible to synthesize bi-metallic nanoparticles presenting higher catalytic activity than the two metals independently[13]. Moreover, four types atoms organization of bi-metallic particles have to be considered: the core-shell, the subcluster segrated, the mixed (alloy) and the three shell. Each of them presented different chemical properties and thus different reativity[14]

Today, the scientific community are trying to find ways which allow to obtain 2 nm nanoparticles where size, shape and exposed facet are controlled in order to specifically design them for a given reaction. The main drawbacks are the very few existing methods to elaborate these nanoparticles. Two strategies have been considered, the top down and the bottom up. Briefly, the first one includes starting with a bulk materials and to destroy it in nanoparticles by different way (mechanical, thermal or irradiative methods). However, the size distribution obtained by these methods are large leading to a heterogeneity of the reactivity. The second one includes the use atoms or ions to growth clusters and nanoparticles. In order to prevent agglomeration and Ostwald ripening, these clusters have to be confined by using physico-chemical system. The most important methods are chemical reduction of metal salts using surfactant and decomposition of preformed organometallics by thermolysis.

Nickel and platinum nanoparticles are widely used for heterogeneous catalysis such as reforming reaction[15-17], dehydrogenation[18], and hydrogenation[19-21] and also for magnetic applications[22]. Separately, these nanoparticles can be prepared by wet chemical reduction in aqueous solution[10, 23-26] or in an organic solvent[21, 27-29], microemulsion[30, 31] and hydrothermal treatment[32, 33]. However the synthesis of small bi-metallic Ni—Pt nanoparticles (<4 nm) with composition controlled and narrow distribution is slightly reported[34-36]. Moreover no synthesis of these materials (composition and size) have been related to be done in aqueous media, certainly due to the reactivity of these particles with water.

A one pot synthesis of 2.1 nm NiPt nanoparticles with a narrow size distribution and a controlled of the composition $Ni_{0.9}Pt_{0.1}$ in atomic ratio by a reverse microemulsion method is described here.

Experimental Section.

Chemicals.

Reverse micro-emulsion system has been prepared by mixing water (MilliQ), cyclohexane (anhydrous, 99.9 Sigma Aldrich) and Polyoxyethylene (5) nonylphenylether (a non-ionic surfactant, Igepal®CO520 also denoted NP5). Nickel nitrate hexahydrate (99.999%-Sigma-Aldrich), platinum (IV) chloride (>99.99%, Sigma-Aldrich) were used as metallic precursor, hydrazine monohydrate ($N_2H_4$ 64-65%, reagent grade 98% Sigma-Aldrich) as reducing agent and ammonium hydroxide solution (28% $NH_3$ in $H_2O$) as precipitated agent.

Synthesis of $Ni_{0.9}Pt_{0.1}$ Nanoparticles

In a typical synthesis of $Ni_{0.9}Pt_{0.1}$ nanoparticles, two identical batch containing the same amount of cyclohexane (54 mL, continuous phase), 17.5 g of NP5 (nonionic surfactant) were loaded in a flask and stirred (600 rpm) at room temperature under air. In one of the batch, 838 μmoles of nickel precursor (244 mg) and 93 μmoles of platinum (IV) chloride (31 mg) previously dissolved in 3.6 ml of water (molar ratio 1/5/125 for NP5/water/cyclohexane) is added under high stirring (900 rpm) until optical transparence leading stability of the micro-emulsion. In the second batch, a aqueous solution containing, 480 μL of hydrazine, 2.1 ml of ammonium hydroxide solution [2M] and 1 ml of water is added under vigorous stirring until optical transparence too (30 min) (molar ratio 1/5/125 for NP5/water/cyclohexane).

Finally the two stable microemulsions (total volume 150 mL) were combined under vigorous stirring (900 rpm) at room temperature under air. A condenser connected to a chiller (15° C.) is added on the flask to avoid any evaporation of cyclohexane. The molar ratio between metals/hydrazine/ammonia is fixed to 1/12/5. The transparent greenish micro-emulsion turned quickly to pink color and is let under stirring (450 rpm) at room temperature until turned to black leading to formation of solid particles (1 week).

Structural Characterization

X-ray diffraction pattern (XRD) pattern was collected using a using a Bruker D8 Advanced A25 diffractometer in Bragg-Brentano geometry fitted with a copper tube. The diffractometer was configured with a 0.18° diverging slit, 3.2° anti scattering slit, 2.5° Soller slits. The data sets were acquired in continuous scanning mode (0.04319°) over the 2θ range 25 to 60° which correspond to the relative intensity to the 1 1 1 plan of face-centered cubic for each pure metal as resume in the Table 1 of Example 2. Analysis was performed by using a silicon wafer in order to avoid background of the holder during the analysis. Due to the small size of the particles and low concentration in micro-emulsion, an adapted sample has been prepared. First, nanoparticles have been embedded into silica by hydrolysis of TEOS in order to keep them confined. Then solvent was removed by using a vacuum system ($10^{-3}$ bar) in order to increase the concentration.

TABLE 1 OF EXAMPLE 2

Crystal structure data of platinum and nickel

| | Crystal structure | Lattice constant (Å) | Space group | d-spacing(Å) related to one miller index (corresponding (2θ) for a 1.5405-CuKα X-Ray) 1 1 1 | 0 2 0 | 2 0 2 | Volume ($Å^3$) |
|---|---|---|---|---|---|---|---|
| Platinum | FCC | 3.92 | Fm3m | 2.265 (39.76) | 1.962 (46.23) | 1.183 (81.25) | 60.32 |
| Nickel | FCC | 3.52 | Fm3m | 2.034 (44.31) | 1.762 (51.85) | 1.246 (76.37) | 43.76 |

Transmission Electron Microscopy (TEM) analyses were performed on a Titan G2 from FEI Company using a Schottky gun (80-300 keV range) and equipped with a EDS (EDAX company), an energy filters (model GIF tridiem from Gatan, Inc) and a 4 k×4 k CCD camera (model US4000 from Gatan, Inc). The size distribution of the particles has been obtained by using High Resolution Transmission Electron Microscopy (HRTEM). Scanning Transmission Electron Microscopy (STEM) combined with a High Angle Annular Dark Filed detector and EDS has been used to recorded nature and composition.

Another microscope, Titan³™ from FEI Company set up with the same equipment than the titan G2 plus a spherical aberration-corrected system (CS-TEM) has been used in order to get shape, composition and elemental analysis of nanoparticles.

Shape has been determined by combining CS-HRTEM (remove electron delocalisation), Electron Energy Loss Spectroscopy (EELS) in zero-loss mode (improve contrast). Simultaneously, by using the fast-Fourrier transform (FFT) technique on the micrographs obtained, determination of the spatial frequencies has been carried out. From these measurements, d-spacing of the phase present (composition) in the sample have been correlated to hypothetical one.

Due to the small size, a specific preparation should be found to separate particles from the surfactant as much as possible but not totally in order to avoid merging of the particles which were beam sensitive. This preparation has, first, comprised preparing a solution composed by, 0.5 mL of microemulsion, 2 mL of water (destabilizing agent), and 15 ml of absolute ethanol (diluting agent). Then, three droplets of 3 μL were, successively, added on an ultrathin carbon film on holey carbon on 400 mesh copper grid (Ted Pella, Inc). Before analysis, the grid was put into plasma cleaner (Model 1020 Plasma Cleaner; Fischione instruments) using a 20%. vol $O_2$ in Ar as gas mixture for 15 s followed by a second session of 8 s.

The magnetic properties of the NiPt nanoparticles were characterized using Quantum Design SQUID-VSM from 5 K to 100 K with applied magnetic field up to 5 Tesla. 150 μl of the microemulsion was loaded into a gelatin capsules (Agar Scientific). In order to extract the contribution from the NiPt nanoparticles, we have measured the control sample (capsule and liquid) as the background. All the data shown below have been corrected by subtracting the background.

Reactions Pathway

In an aqueous media, metallic particles are, generally, reduced, by sodium borohydride. However, borohydride ions are known to reduce metal cations to metal borides, especially nickel[37]. On the another hand, hydrazine is more interesting because of its ability to reduce a metal precursor is directly linked to pH and temperature of the reaction leading to a control of the reduction rate[38].

In acidic media, the hydrazine species involved in the reduction reaction is $N_2H_5^+$ which has a standard reduction potential of −0.23V ($N_2+5H^++4e^-=N_2H_5^+$) whereas in basic media, the standard reduction potential of $N_2H_4$ is −1.16V ($N_2H_4+4OH^-=N_2+4H_2O+4e^-$). In the case of nickel, standard potential reductions of $Ni^{2+}$ and $Ni(OH)_2$ ($Ni(OH)_2+2e^-=Ni+2OH^-$) are respectively −0.25V and −0.76V and is 0.73V for $Pt^{4+}$ ($PtCl_4+2e-=Pt+4Cl^-$). Thus, in order to perform the reduction, aqueous system in microemulsion has to be basic and maintain this alkalinity sufficient in order to perform the reduction but not too much to avoid the quick formation of nickel hydroxide (aggregation). To control the quick formation of nickel hydroxide, nickel and hydrazine form a stable complex which could prevent the hydrolysis of nickel. Finally, a control of the molar ratio between nickel precursors, hydrazine, and a base (in this study ammonium hydroxide) is a parameter to drive the reduction rate and consequently the particle size of the nanoparticles. The reaction pathways are given as following:

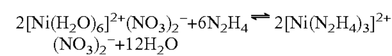

$$2[Ni(H_2O)_6]^{2+}(NO_3)_2^-+6N_2H_4 \rightleftharpoons 2[Ni(N_2H_4)_3]^{2+}(NO_3)_2^-+12H_2O$$

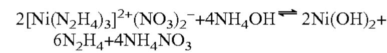

$$2[Ni(N_2H_4)_3]^{2+}(NO_3)_2^-+4NH_4OH \rightleftharpoons 2Ni(OH)_2+6N_2H_4+4NH_4NO_3$$

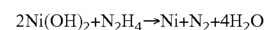

$$2Ni(OH)_2+N_2H_4 \rightarrow Ni+N_2+4H_2O$$

$$2Ni^{2+}+N_2H_4+4OH^- \rightarrow 2Ni+N_2+4H_2O$$

Compared to nickel, platinum forms a less stable complex with hydrazine and thus is quickly reduce to metallic form[39]. This reactivity between platinum and nickel is another parameter in order synthesis a NiPt alloy. Indeed, because platinum is quickly reduced, first it nucleates and can help to the nucleation of nickel as it has been already related[40].

Results

FIG. 2.1 shows a TEM image of the synthesized NiPt nanoparticles embedded in the capping agent. The statistical analysis of the particle size distribution gives an average diameter of 2.2±0.3 nm. Most of the particles are uniform as shown on the.

FIG. 2.2. The determination of composition of the particles has been analyzed by combining STEM-EDS (Size i.e. (FWHM)=1 nm), measurement of the d-spacing by fourrier transform and XRD analysis.

STEM-EDS spectrum (FIG. 2.3) allowed us to analysis the particle one by one when they are isolated. The analysis has been done on several particles and most of them (>98%) were in agreement of the theoretical composition. However, two other compositions have been also observed which have been identified as NiPt and $Ni_3Pt$. These two other compositions are well known to be thermodynamic favored as related in the binary alloy phase diagram[41]. However, due to the standard deviation of the EDS quantification, other analysis have been done to correlate this result.

XRD analysis, which is normally a powerful characterization for phase determination, was not totally validating. Despite a specific preparation, intensity of the recorded peak was very low. It can be explained by the very small amount of particles but also by the very small size which lead to very few diffraction. However, one peak has been observed as resumed on the FIG. 2.4. This peak has a maxima of intensity at 43.96° (obtained by gaussian deconvolution) and is extra large (FWHM=13°) due to the small size of the particles. The theoretical value of the 111 (main intensity) for a $Ni_9Pt$ crystal in FCC structure should be a linear combination of the pure platinum and nickel crystal structure (both FCC) leading to a peak at 43.855°. Two explanation can be done to explain this shift. The first one came from the diffraction of the second main intense peak corresponding to the plan 200. Indeed, it should, theoretically, appeared, at 51.288°. Thus the first peak overlapped on the second. Another explanation is due to the very small size of the particle. It has been already related that very small particles (<4 nm), in order to decrease as much as possible their surface energy can take a spatial configuration slightly different leading to a different Miller index[42]. No peak is observed at 42.035° and 43.173° which are the main intensity peak of the 111 plan of NiPt and $Ni_3Pt$ respectively. It is explained by the very low amount of those two populations into the sample.

The last characterization for the composition of the synthesized nanoparticles has been the measurement of d-spacing by Fast Fourrier Transform (FFT) on the High Resolution Transmission Electron Microscopy (HRTEM).

Depending of the size, particles exhibits different shapes. Particles with a diameter bigger than 2.3 nm have a spherical shape whereas smaller particles (ø<2.3 nm) are clearly faceted as observed by Corrected Spherical-HRTEM FIGS. (2.5*a* and 2.5*b*). This unperfected shape can be correlated to a truncated cubo-octahedron which is considered as the thermodynamic shape for a Face-Centered Cubic (FCC) cell clusters especially for Ni—Pt system[14]. However, nickel clusters is reported[43-46] to have a stable icosahedral structure until 1200 atoms whereas platinum and other noble metals (Au, Pd etc.) have a transition from icosahedral to truncated cubo-octahedral structure from 100 atoms. For a 2.2 nm $Ni_{0.9}$ $Pt_{0.1}$, the number of atoms is about 500 based on an extension of the spherical cluster approximation consisting to determine the number of atoms by estimate a ratio between the cluster volume $V_c$ and an effective atomic volume$V_a$[+1]. This number is closed to the "magic numbers" determine by modelling for pure nicker and platinum cluster[48]; the deviation can be explain by the temperature which is closed to 0K in most of the simulation studies. Thus, the shape of NiPt nanoparticles, inspite the 90 percent in atoms of nickel, is governed by the platinum atoms. From this approximation and based on previous study[49, 50], these nanoparticles exhibit a 3 edge atoms (m) of the truncated octahedron whom excedent atoms are on the face as resume on the FIGS. 2.6A and 2.6B.

Experiment have been also carried out in order to determine where are located platinum compare to nickel. Indeed it has been several times related in the case of bi-metallic particles, that atoms of one element car be positioned in specific place, or to be regroup together to form the so-called core-shell structure and or to be randomly located into the particle. For this, STEM beam has been decreased as much as possible (FWTM diameter=0.7 nm) and EDS has been used as analyzer. At this level of analysis, beam spreading (b) has been determined, based on the single scattering model as resumed by Goldstein et al[51]:

$$b = 8 \times 10^{-12} \frac{Z}{E_0} (N_v)^{1/2} t^{3/2}$$

where b and t (thickness) are in m, $E_0$ is in KeV and Nv the number of atoms/$m^3$. Thus elemental analysis of 7±0.3 Å section of the particles have been done leading to three part analysis. Results showed (FIGS. 2.6A and 2.6B) the same apparent ratio between nickel and platinum into the external and internal shell of one particle whatever this one. Due to the presence of the capping agent which lead to a quick carbon contamination under STEM beam and also quick merging of the unveiled particles, results are only qualitative (semi empirical).

Squid:

The properties of $Ni_{0.9}Pt_{0.1}$ nanoparticles of 2.1 nm in diameter FIG. 2.7 shows the temperature dependent magnetization of the nanoparticles measured with zero-field cooled (ZFC) and Field cooled (FC) process under a low magnetic field of 100 Oe. It is clear that a narrow peak appears in the ZFC curve, which corresponding to the blocking of the magnetic moments of the nanoparticles with a narrow size distribution[52]. The peak temperature that represents the average blocking temperature, $T_B$=10.5 K, is governed by the magnetic anisotropy and volume of the particles, i.e. 25 $k_B T_B$=KV, where K is the effective anisotropy constant, V the volume of the nanoparticles and $K_B$ is Boltzmann constant. By taking the diameter of 2.1 nm and $T_B$=10.5 K, we calculated the magnetic anisotropy K=7.47*$10^6$ erg/$cm^3$ is much larger than K=−1.2*$10^6$ erg/$cm^3$ at 4.2 K for bulk Ni[53]. The much larger anisotropy constant in (nanoparticles) is mainly due to the surface and shape effect[54]. Since our particles are quite spherical and very small, the surface effect should dominate. Take the face-centered-cubic (fcc) structure of Ni with lattice constant of 3.5238 Å, the percentage of surface atoms is around 25%. Above the blocking temperature, both ZFC and FC follow the Curie-Weiss law.

Shown in FIG. 2.8 are the hysteresis loops measured at 5 K and 100 K. The hysteresis loops measured at 5K was corrected by removing the diamagnetic contribution from diamagnetic solution and cage. It is interesting that it is hard to saturate the Ni nanoparticles even at 5 T magnetic field (insets to FIG. 2.8). This could be due to the large percentage surface spins (about 25%) in 2.1 nm nanoparticles. The surface spins usually form a spin-glass phase[54, 55] and/or behave paramagnetically. The moderate coercive field, $H_c$=200 Oe indicate that the crystallization of the particles is very good, and non-spin glass phase was formed. If the spin-glass phase was formed the coercive field will be increased to several kOe[55, 56] as we observed sample D and E. So the some surface spins are paramagnetic which lead to the un-saturated magnetization even at 5 K. It is clear that at 100 K, the magnetization is dominated by the diamagnetic solution and cage, because the paramagnetic contribution from NiPt particles is negligible in comparison to the diamagnetic solution and cage.

REFERENCES FOR EXAMPLE 2, EACH OF WHICH ARE INCORPORATED BY REFERENCE

1. Johnston, R. L., *Atomic and Molecular Clusters*. Taylor and Francis: London, 2002.

2. Jortner, J. *Zeitschrift für Physik D Atoms, Molecules and Clusters* 1992, 24, (3), 247-275.
3. Bruchez, M.; Moronne, M.; Gin, P.; Weiss, S.; Alivisatos, A. P. *Science* 1998, 281, (5385), 2013-2016.
4. Murray, R. W. *Chem. Rev.* 2008, 108, (7), 2688-2720.
5. Cortie, M. B.; McDonagh, A. M. *Chem. Rev.* 2011, 111, (6), 3713-3735.
6. Alivisatos, A. P.; Johnsson, K. P.; Peng, X.; Wilson, T. E.; Loweth, C. J.; Bruchez, M. P.; Schultz, P. G. *Nature* 1996, 382, (6592), 609-611.
7. Kamigaito, M.; Ando, T.; Sawamoto, M. *Chem. Rev.* 2001, 101, (12), 3689-3746.
8. Zhou, K.; Li, Y. *Angew. Chem. Int. Ed.* 2012, 51, (3), 602-613.
9. Zhou, K.; Wang, X.; Sun, X.; Peng, Q.; Li, Y. *J. Catal.* 2005, 229, (1), 206-212.
10. Ahmadi, T. S.; Wang, Z. L.; Green, T. C.; Henglein, A.; El-Sayed, M. A. *Science* 1996, 272, (5270), 1924-1925.
11. Gschneidner, K.; Russell, A.; Pecharsky, A.; Morris, J.; Zhang, Z.; Lograsso, T.; Hsu, D.; Chester Lo, C. H.; Ye, Y.; Sleger, A.; Kesse, D. *Nat Mater* 2003, 2, (9), 587-591.
12. Krenke, T.; Duman, E.; Acet, M.; Wassermann, E. F.; Moya, X.; Manosa, L.; Planes, A. *Nat Mater* 2005, 4, (6), 450-454.
13. Wang, D.; Li, Y. *J. Am. Chem. Soc.* 2010, 132, (18), 6280-6281.
14. Ferrando, R.; Jellinek, J.; Johnston, R. *L. Chem. Rev.* 2008, 108, (3), 845-910.
15. Chen, Y.-g.; Ren, *J. Catal. Lett.* 1994, 29, (1), 39-48.
16. Choudhary, V. R.; Rajput, A. M.; Prabhakar, B. *Catal. Lett.* 1992, 15, (4), 363-370.
17. Rostrup-Nielsen, J. R., in *Catalysis, Science and Technology*. In (eds Anderson, J. R. & Boudart, M.): Vol. 5, pp 1-117 (Springer, Berlin, 1984).
18. Metin, O. n.; Mazumder, V.; Ôzkar, S.; Sun, S. *J. Am. Chem. Soc.* 2010, 132, (5), 1468-1469.
19. Zeng, Y. F.; Imbihl, R. *J. Catal.* 2009, 261, (2), 129-136.
20. Boualleg, M.; Norsic, S.; Baudouin, D.; Sayah, R.; Quadrelli, E. A.; Basset, J. M.; Candy, J. P.; Delichere, P.; Pelzer, K.; Veyre, L.; Thieuleux, C. *J. Catal.* 2011, 284, (2), 184-193.
21. Wang, A.; Yin, H.; Lu, H.; Xue, J.; Ren, M.; Jiang, T. *Langmuir* 2009, 25, (21), 12736-12741.
22. Lee, I. S.; Lee, N.; Park, J.; Kim, B. H.; Yi, Y.-W.; Kim, T.; Kim, T. K.; Lee, I. H.; Paik, S. R.; Hyeon, T. *J. Am. Chem. Soc.* 2006, 128, (33), 10658-10659.
23. Single, M. L.; Negi, A.; Mahajan, V.; Singh, K. C.; Jain, D. V. S. *Applied Catalysis A: General* 2007, 323, (0), 51-57.
24. Choi, J.-Y.; Lee, Y.-K.; Yoon, S.-M.; Lee, H. C.; Kim, B.-K.; Kim, J. M.; Kim, K.-M.; Lee, J.-H. *J. Am. Ceram. Soc.* 2005, 88, (11), 3020-3023.
25. Chen, D.-H.; Hsieh, C.-H. *J. Mater. Chem.* 2002, 12, (8), 2412-2415.
26. Wang, L.; Yamauchi, Y. *Chem. Mater.* 2009, 21, (15), 3562-3569.
27. Hou, Y.; Gao, S. *J. Mater. Chem.* 2003, 13, (7), 1510-1512.
28. Ely, T. O.; Amiens, C.; Chaudret, B.; Snoeck, E.; Verelst, M.; Respaud, M.; Broto, J.-M. *Chem. Mater.* 1999, 11, (3), 526-529.
29. Wang, Y.; Ren, J.; Deng, K.; Gui, L.; Tang, Y. *Chem. Mater.* 2000, 12, (6), 1622-1627.
30. Chen, D.-H.; Wu, S.-H. *Chem. Mater.* 2000, 12, (5), 1354-1360.
31. Härelind Ingelsten, H.; Béziat, J.-C.; Bergkvist, K.; Palmqvist, A.; Skoglundh, M.; Qiuhong, H.; Falk, L. K. L.; Holmberg, K. *Langmuir* 2002, 18, (5), 1811-1818.
32. Wang, C.; Zhang, X. M.; Qian, X. F.; Xie, Y.; Wang, W. Z.; Qian, Y. T. *Mater. Res. Bull.* 1998, 33, (12), 1747-1751.
33. Viswanath, B.; Patra, S.; Munichandraiah, N.; Ravishankar, N. *Langmuir* 2009, 25, (5), 3115-3121.
34. Singh, S. K.; Xu, Q. *Inorg. Chem.* 2010, 49, (13), 6148-6152.
35. Li, Y.; Zhang, X. L.; Qiu, R.; Qiao, R.; Kang, Y. S. *J. Phys. Chem. C.* 2007, 111, (29), 10747-10750.
36. Leonard, B. M.; Zhou, Q.; Wu, D.; DiSalvo, F. *J. Chem. Mater.* 2011, 23, (5), 1136-1146.
37. Glavee, G. N.; Klabunde, K. J.; Sorensen, C. M.; Hadjipanayis, G. C. *Langmuir* 1994, 10, (12), 4726-4730.
38. Aylward, F.; Rao, C. V. N. *Journal of Applied Chemistry* 1956, 6, (6), 248-252.
39. Chatt, J.; Shaw, B. L. *Journal of the Chemical Society (Resumed)* 1962, 5075-5084.
40. Grzelczak, M.; Pérez-Juste, J.; Rodríguez-González, B.; Spasova, M.; Barsukov, I.; Farle, M.; Liz-Marzán, L. M. *Chem. Mater.* 2008, 20, (16), 5399-5405.
41. Massalski, T. B.; Okamoto, H.; Subramanian, P. R.; Kacprzak, L., *Binary Alloy Phase Diagrams*. ASM International ed.; 1990.
42. Makhlouf, S.; Kassem, M.; Abdel-Rahim, M. *Journal of Materials Science* 2009, 44, (13), 3438-3444.
43. Berry, S.; Smirnov, B., Clusters with Short-Range Interaction Phase Transitions of Simple Systems. In Springer Berlin Heidelberg: 2008; Vol. 42, pp 51-74.
44. Cleveland, C. L.; Landman, U. *J. Chem. Phys.* 1991, 94, (11), 7376.
45. Baletto, F.; Ferrando, R. *Reviews of Modern Physics* 2005, 77, (1), 371-423.
46. Schebarchov, D.; Hendy, S. C. *Phys. Rev. Lett.* 2005, 95, (11), 116101.
47. Pellarin, M.; Baguenard, B.; Vialle, J. L.; Lermé, J.; Broyer, M.; Miller, J.; Perez, *A. Chem. Phys. Lett.* 1994, 217, (4), 349-356.
48. Lee, S. H.; Han, S. S.; Kang, J. K.; Ryu, J. H.; Lee, H. M. *Surf. Sci.* 2008, 602, (7), 1433-1439.
49. Van Hardeveld, R.; Hartog, F. *Surf. Sci.* 1969, 15, (2), 189-230.
50. Romanowski, W. *Surf. Sci.* 1969, 18, (2), 373-388.
51. Goldstein, J.; Williams, D.; Cliff, G., *Quantitative x-ray analysis, Chapter 5 in Principles of Analytical Electron Microscopy*. Plenum press: New York, 1986.
52. Zheng, R. K.; Gu, H.; Xu, B.; Zhang, X. X. *Physical Review B* 2005, 72, (1), 014416.
53. O'Handley, R. C., *Modern Magnetic materials: principles and applications*. John Wiley & Sons: New York, 2000.
54. Leslie-Pelecky, D. L.; Rieke, R. D. *Chem. Mater.* 1996, 8, (8), 1770-1783.
55. Kodama, R. H.; Berkowitz, A. E.; McNiff, J. E. J.; Foner, *S. Phys. Rev. Lett.* 1996, 77, (2), 394-397.
56. Zheng, R. K.; Wen, G. H.; Fung, K. K.; Zhang, X. X. *Physical Review B* 2004, 69, (21), 214431.

Example 3

Introduction

One of predominant field of research for the XXI century is the modification of natural gas, which is mainly composed of methane, to easily transportable valuable products (such as hydrocarbons, gasoline, methanol, and dimethyl ether). Due to the exponentially increasing energetic requirements of the world, new types of energy have to be enhanced, oil cannot provide for all. Moreover, this fossil energy leads to global warning due to $CO_2$ generation during chemical transformations. Many efforts are done in order to reduce $CO_2$ formation but also to use it into chemical processes ($CO_2$-rich gas syntheses).

Today, most of the carbonaceous gas-to-liquid (GTL) reactions use syngas ($H_2$/CO mixture) as reagent. This mixture is synthesized by the steam reforming of methane (Equation 5). However, the 3:1 $H_2$/CO ratio obtained by this process is not well adapted to GTL technologies.

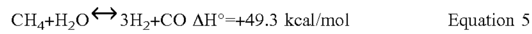

$$CH_4+H_2O \leftrightarrow 3H_2+CO\ \Delta H°=+49.3\ \text{kcal/mol} \quad \text{Equation 5}$$

One alternative is the dry reforming of methane (DRM) (Equation 6), which constitutes both an industrial and academic challenge.

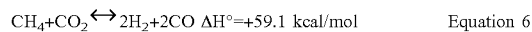

$$CH_4+CO_2 \leftrightarrow 2H_2+2CO\ \Delta H°=+59.1\ \text{kcal/mol} \quad \text{Equation 6}$$

This reaction, first, valorizes $CO_2$ but also gives an "ideal" 1:1 $H_2$/CO ratio for the gas-to-liquid application such as the Fischer-Tropsch process for long chain of hydrocarbons (Equation 7) and the dimethyl ether synthesis (Equation 8).

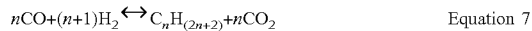

$$nCO+(n+1)H_2 \leftrightarrow C_nH_{(2n+2)}+nCO_2 \quad \text{Equation 7}$$

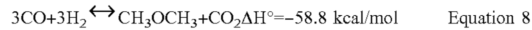

$$3CO+3H_2 \leftrightarrow CH_3OCH_3+CO_2\Delta H°=-58.8\ \text{kcal/mol} \quad \text{Equation 8}$$

However, this reaction is not easy to scale-up due to its high endothermicity and to the nature of the two reagents. The main limitation is the stability of the catalyst. The two main causes for deactivation are sintering (growth) of metallic nanoparticles and formation of carbonaceous deposits (coking), which both result in a loss of active sites.

Amongst the $d^6$, $d^7$ and $d^8$ transition metals that can efficiently catalyze DRM, nickel is considered the best candidate for industrial application, combining high activity and low cost [1, 2]. However, it is more sensitive to coking and sintering than noble metals.

Recently, it has been claimed that the Carbon Sciences® catalyst based on bi-metallic particles (Co—Ni) supported on MgO—$Al_2O_3$ exhibited extended durability in DRM. It combines modification of both the nickel particle and the alumina support (by alloying and by addition of basic functions, respectively) which are both known to increase coke resistance and lifetime of the catalyst [3, 4]. However, since coking is reported to mainly occur on metal particles typically larger than 10 nm [5, 6], synthesizing smaller nickel particles (<5 nm) and focusing on stabilizing their size throughout the DRM reaction should prove useful in further enhancing the durability of the DRM catalyst. One way to achieve that is to elaborate a bi-metallic system in which the second metal has a higher melting point than nickel [7], such as a noble metal [8], for example.

Experimental

The synthesis of $Ni_{0.9}Pt_{0.1}$ nanoparticles is carried out in a reverse micro-emulsion "water in oil" system using cyclohexane as continuous phase, water as discontinuous media and polyoxyethylene (5) nonylphenylether (as nonionic surfactant Igepal®CO520 also denoted NP5). Co-reduction of the metal nitrates is achieved by a mixture of hydrazine and ammonia in excess.

The details regarding the deposition are described in Example 1.

The materials were characterized in the solid-state by the numerous physico-chemical techniques available in KCC (XRD, BET) and in KAUST Core Facilities (HRTEM, EF-TEM, EDS-STEM, HAADF, SQUID).

Catalytic tests are carried out at atmospheric pressure in a fixed bed reactor (o.d. 6 mm, i.d. 4 mm quartz reactor) fitted with online μ-GC analysis, using a gas mixture (60 sccm) composed of 10 vol. % $CH_4$/10 vol. % $CO_2$ in Ar.

Experimental:

$Al_2O_3$ supported bimetallic nanoparticles prepared by microemulsion have been characterized catalytically under typical conditions of $CO_2$ reforming of methane. The catalysts performance was examined using a dynamic gas phase reactor. A 4 mm inner diameter and 30.5 mm length quartz reactor is used. The reaction gases, $CH_4$ and $CO_2$ are diluted with inert gas $N_2$. An online micro GC (Varian 490-GC or Soprane MicroGC 3000) is used to analyze the outlet gases.

Typically, 50 mg of γ-$Al_2O_3$ supported NiPt catalyst (5% weight loading) prepared by microemulsion; diluted 1/3 with SiC, is loaded in the quartz reactor. The system is heated up to 700° C. under 80 mL/min $N_2$. Then a $H_2$-reduction step is performed at this temperature for 1 h with 20% $H_2$ in $N_2$, 80 ml/min total flow. The system is then purged again with 80 mL/min of $N_2$ for 1 h. Finally, the reactant gas with 8/1/1 of $N_2/CH_4/CO_2$ is introduced into the reactor to start the DRM reaction with a WHSV of 120 $L \cdot h^{-1} \cdot g^{-1}$.

As illustrated by FIG. 3.1, first catalytic results gave a promising $CH_4$ to $H_2$ conversion, stable over 100 h time with a $H_2$/CO of 0.85. $Ni_9Pt_1$ catalyst (5% loading on γ-$Al_2O_3$) converted about 60% $CO_2$ & 50% $CH_4$. Under DRM conditions, $Ni_9Pt_1$ catalyst prepared by the method herein has a very good behavior contrary to most known reference catalysts, for which conversion decreases progressively over time. After a slight conversion drop in the very beginning of the test, conversion, using $Ni_9Pt_1$ prepared by the described microemulsion method, slowly increases back along the next 20 h and then remains stable up to 100 h. Moreover, selectivity over $Ni_9Pt_1$ for both CO and $H_2$ are stable along the time with 90 & 85% respectively and a stable $H_2$/CO ratio around 0.85 as well.

Results

In this micro-emulsion, $Ni_{0.9}Pt_{0.1}$ particles are uniform in size. Statistical analysis of their size (TEM) gives a narrow distribution with an average diameter of 2.2±0.3 nm (FIG. 3.2), which is consistent with the mean size determined by SQUID.

The composition of each bimetallic particle, as determined by EDS-STEM, matches the 90/10 nominal composition. Statistical d-spacing measurements by Fast-Fourrier Transform in HRTEM and XRD analysis both show that the nanoparticles consist in a solid solution of Ni and Pt atoms. The facets exposed, as evidenced by CS-HRTEM, are consistent with a truncated octahedral shape (cubo-octahedron) of the 2 nm alloy particle (FIG. 3.3).

Exemplary TEM images are shown in FIGS. 1.1 and 1.2 in Example 1. Exemplary conversion of CH4 and CO2 are shown in FIG. 3.1 above.

Conclusions

We have developed a method for the synthesis of Ni-rich nickel-platinum particles with controlled size (2 nm) and composition (solid solution). After deposition on selected supports, and in particular boehmite, $TiO_2$, $ZrO_2$, $ZrO_2$, $Al_2O_3$/Ni spinel, activated carbon. The supported NiPt catalyst exhibited an enhanced activity and high stability in the dry reforming of methane. Besides, this generic method can be applied to the synthesis of other bimetallic nanoparticles and can lead to the design of an optimized DRM catalyst.

REFERENCES FOR EXAMPLE 3, EACH OF WHICH IS INCORPORATED HEREIN BY REFERENCE

[1] M. C. J. Bradford, M. A. Vannice, Catal. Rev. 41 (1999) 1.
[2] V. Havran, M. P. Dudukovi, C. S. Lo, Indus. & Eng. Chem. Res. 50 (2011) 7089.
[3] T. Horiuchi, K. Sakuma, T. Fukui, Y. Kubo, T. Osaki, T. Mori, Appl. Catal. A 144 (1996) 111.
[4] K. Nagaoka, K. Takanabe, K.-i. Aika, Appl. Catal. A 268 (2004) 151.
[5] J.-H. Kim, D. J. Suh, T.-J. Park, K.-L. Kim, Appl. Catal A 197 (2000) 191.
[6] J. Guo, H. Lou, X. Zheng, Carbon 45 (2007) 1314.
[7] A. Cao, G. Veser, Nature Mater. 9 (2010) 75.
[8] D. Li, Y. Nakagawa, K. Tomishige, Appl. Catal. A 408 (2011) 1.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to figures and the measurement techniques. In addition, the phrase "about 'x' to 'y'" includes "about 'x' to about 'y'". When a range includes "zero" and is modified by "about" (e.g., about one to zero or about zero to one), about zero can include, 0, 0.1, 0.01, or 0.001.

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

We claim at least the following:

1. A method, comprising:

providing supported $Ni_xPt_y$ nanoparticle material, the supported $Ni_xPt_y$ nanoparticle material comprising $Ni_xPt_y$ nanoparticles having an average size of about 1.5 to 3 nm, and wherein x is about 0.85 to 0.95 and y is about 0.05 to 0.15; and using the supported $Ni_xPt_y$ nanoparticle material for $CO_2$ reforming of methane, by mixing and reacting methane and $CO_2$ and interacting the methane and $CO_2$ with the supported $Ni_xPt_y$ nanoparticle material serving as a catalyst for the reaction.

2. The method of claim 1, wherein the average size of the $Ni_xPt_y$ nanoparticles is about 1.9 to 2.5 nm.

3. The method of claim 1, wherein x is about 0.9 and y is about 0.1.

4. The method of claim 1, wherein the $Ni_xPt_y$ nanoparticle material a functional nanomaterial.

5. The method of claim 1, wherein the $Ni_xPt_y$ nanoparticles of the $Ni_xPt_y$ nanoparticle material are disposed on a support and the support is $\gamma$-$Al_2O_3$.

6. The method of claim 1, wherein the $Ni_xPt_y$ nanoparticles of the $Ni_xPt_y$ nanoparticle material are disposed on a support and the support is selected from the group consisting of alumina, ceria, silica, titania, and activated carbon.

7. The method of claim 1, wherein the method includes synthesizing nickel particles smaller than 5 nm and stabilizing their size throughout the reaction.

8. The method of claim 1, wherein the $Ni_xPt_y$ nanoparticles of the $Ni_xPt_y$ nanoparticle material are disposed on a support and the support is selected from the group consisting of boehmite, $TiO_2$, $ZiO_2$, $Ce_2O_3$, and earth-alkali alumina spinels.

* * * * *